United States Patent [19]

Heling

[11] Patent Number: 4,607,884
[45] Date of Patent: Aug. 26, 1986

[54] VEHICLE EASY ENTRY SEAT LATCHING MECHANISM

[75] Inventor: Dennis H. Heling, Canton, Mich.

[73] Assignee: Chrysler Corporation, Highland Park, Mich.

[21] Appl. No.: 638,311

[22] Filed: Aug. 6, 1984

[51] Int. Cl.⁴ .............................................. B60N 1/04
[52] U.S. Cl. .................... 297/341; 248/429; 297/379
[58] Field of Search ............... 297/341, 340, 379, 378; 248/429, 430; 296/65 R

[56] References Cited

U.S. PATENT DOCUMENTS

| | | | |
|---|---|---|---|
| 3,931,995 | 1/1976 | Arai | 297/341 |
| 4,015,877 | 4/1977 | Button | 297/341 |
| 4,065,178 | 12/1977 | Carella | 297/341 |
| 4,143,911 | 3/1979 | Sakakibara et al. | 297/341 |
| 4,159,147 | 6/1979 | Kiyomitsu et al. | 297/341 |
| 4,423,904 | 1/1984 | Crawford | 297/341 |

FOREIGN PATENT DOCUMENTS

| | | | |
|---|---|---|---|
| 0091427 | 7/1980 | Japan | 297/341 |
| 2033738 | 5/1980 | United Kingdom | 297/341 |

*Primary Examiner*—James T. McCall
*Attorney, Agent, or Firm*—Edward P. Barthel

[57] ABSTRACT

An easy entry vehicle seat latch mechanism compatible with conventional inertia latch, recliner, and horizontal seat adjusting systems. A dual function easy entry latch mechanism is provided which initially unlatches a seat horizontal adjuster and subsequently resiliently holds the seat back in a forwardly tilted easy entry position. The mechanism allows the front seat to be readily traversed fore and aft either by a person standing outside the vehicle or by a rear seat passenger exiting the vehicle when the front seat is unoccupied.

5 Claims, 11 Drawing Figures

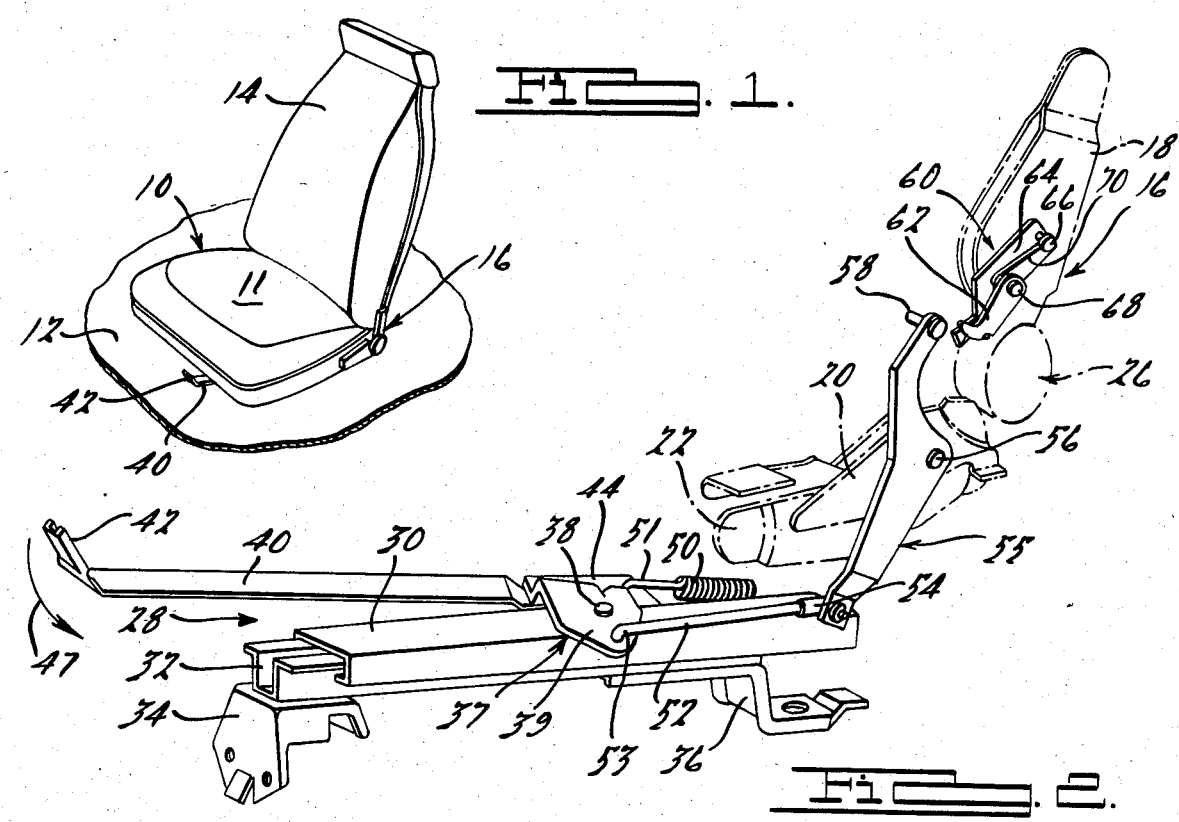
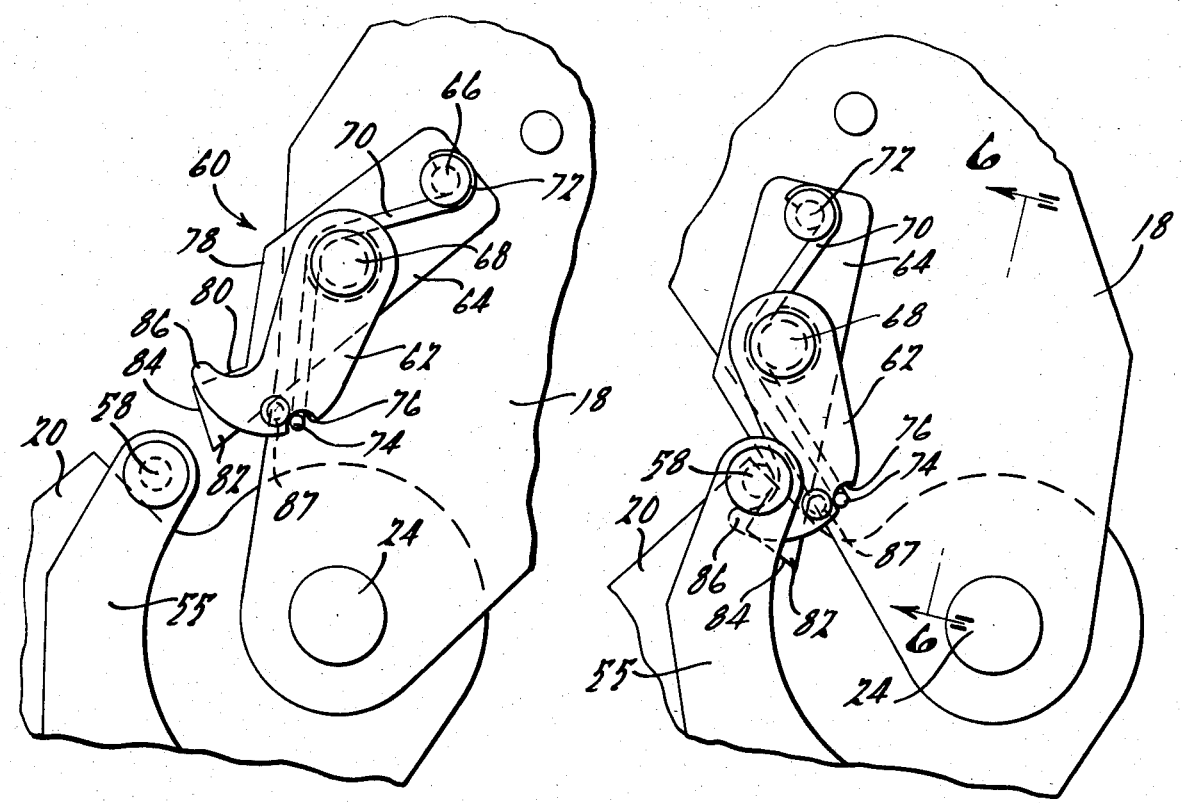

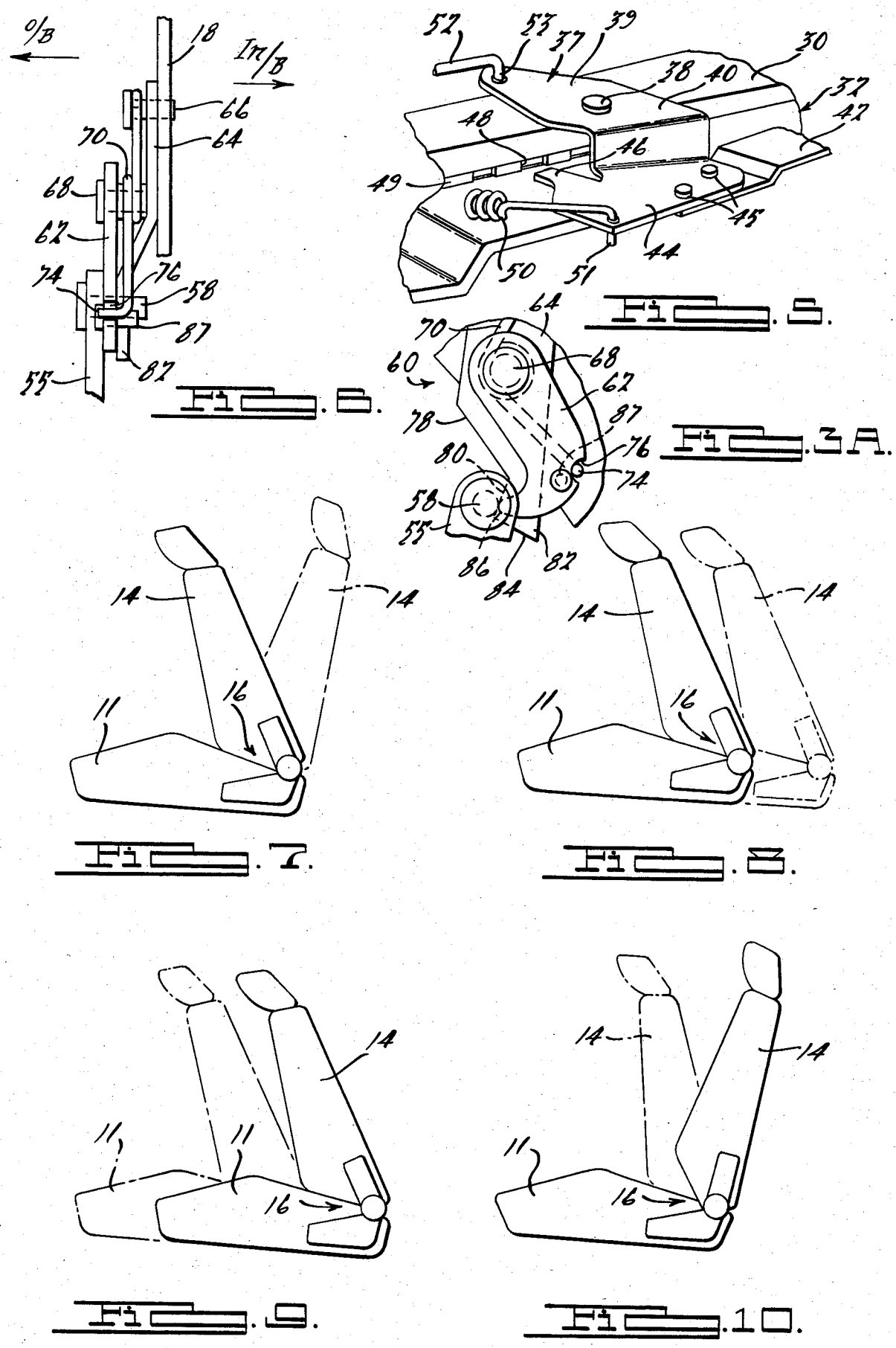

VEHICLE EASY ENTRY SEAT LATCHING MECHANISM

The invention relates to an adjustable seat assembly for an automotive vehicle, and more particularly to a novel latching mechanism for a seat back inertia latch system providing easy entry of passengers to the rear seat area of the vehicle.

BACKGROUND OF THE INVENTION

The U.S. Pat. No. 4,440,442 to Drouillard et al discloses a seat position control mechanism with an inboard slave track and outboard control track arrangement having a pair of the same track assemblies arranged in vertically stacked relationship. One of the outboard track assemblies provides for horizontal adjustment of the seat and the other provides for movement of the seat to and from an easy entry position. A control cable arrangement interconnects a tilting seat back and latch mechanism for the other outboard track assembly to release a latch mechanism and permit movement of the seat to the easy entry position.

SUMMARY OF THE PRESENT INVENTION

The seat position control mechanism of this invention provides an easy entry vehicle seat arrangement having a dual acting seat back latch mechanism incorporating both horizontal seat cushion track adjustment and resilient forwardly locked positioning of the seat back to an easy entry position. The seat assembly is adjusted for easy entry by initially manually pivoting the upright seat back forwardly toward a tilted and latched position. The initial forward tilting movement of a seat back self-actuating resilient latch mechanism unlatches the seat track. Subsequent tilting of the seat back causes the latch mechanism to lock the seat back in a forward tilted position. The seat assembly is thus free for horizontal movement in a forward direction on the unlocked track for easy entry with the seat back held in its forwardly tilted locked position.

To return the seat assembly to a selected horizontal position the operator slides the tilted seat back and seat cushion assembly rearwardly on the unlocked track. When the rearward sliding effort on the seat exceeds the seat back latch spring bias, the seat back unlocks allowing the operator to return the seat back to its upright position. The unlocking of the seat back causes the track latching assembly to relock the track. Thus, by selecting the point during the rearward travel of the seat cushion at which the seat back is returned to its upright position the operator selects the horizontal location of the seat cushion. With the seat back in its upright position the operator may also use the track control handle to horizontally adjust the seat cushion in a conventional manner.

It is thus a feature of the present invention to provide the improved vehicle seat assembly described above having a dual self-actuating latch mechanism which permits easy rear seat entry by an operator pivoting the upright seat back to a forwardly tilted and latched position thereby initially unlocking the seat cushion track and subsequently locking the seat back in a forward tilted mode enabling the seat to be moved to an easy entry position.

A further object of the present invention is to provide an easy entry seat latch mechanism wherein the seat cushion can only be occupied by a passenger with the seat cushion horizontal adjustment track latched and the seat back in its normal upright position.

It is still another object of the present invention to allow either an operator standing outside the vehicle or a rear seat passenger to readily control the horizontal adjustment of the seat cushion by varying the position at which the operator exerts a force on the forwardly latched seat back when returning the seat assembly to a selected horizontal position.

These and other objects, features and advantages of the invention will be apparent from the accompanying drawings and the detailed description of the preferred embodiment of the invention.

BRIEF DESCRIPTION OF THE DRAWINGS

FIG. 1 is a perspective view of an automotive seat assembly embodying the easy entry seat back latch arrangements of the invention;

FIG. 2 is a perspective view of the vehicle seat latching mechanism of FIG. 1;

FIG. 3 is an enlarged elevational view of the seat back latch of FIG. 2 shown unlatched and with the seat back in the normal upright position;

FIG. 3A is a fragmentary view of the seat back latch of FIG. 3 in its intermediate position;

FIG. 4 is a view similar to FIG. 3 with the seat back latch shown latched and with the seat back tilted forward;

FIG. 5 is a partial perspecitve view of the carrier latch portion of the track latching mechanism in its unlatched mode;

FIG. 6 is a fragmentary end elevational view taken of substantially on the line 6—6 of FIG. 4;

FIG. 7 is a partially schematic side elevational view of the seat assembly of FIG. 1 shown in its normal aft position with the seat back pivoted forward from its dashed-line normal position to its latched tilted position;

FIG. 8 is a view similar to FIG. 7 showing the seat assembly moved forward to its track unlocked easy enter position;

FIG. 9 is a view similar to FIG. 7 showing the seat cushion returned to its normal position from its dashed-line forward position with the seat back maintained in its latched tilted mode; and FIG. 10 is a view similar to FIG. 7 showing the seat assembly in its normal track locked position and the seat back returned to its unlatched upright mode with the track relatched.

DETAILED DESCRIPTION OF THE PREFERRED EMBODIMENTS

Referring to FIG. 1 a vehicle seat 10 according to the invention is shown positioned in the front or forward portion of the passenger compartment of a motor vehicle on the driver's side. Thus, the near side of the seat assembly in FIG. 1 is the outboard side of the vehicle. The vehicle seat 10 comprises a seat cushion 11 secured to the vehicle floor 12, and a seat back 14.

The seat back 14 includes a frame structure, not shown, supporting the spring and fabric portions of the seat. The seat back frame structure provides a sheet metal side hinge member 16. In FIG. 2 the hinge member is shown with an upper arm 18 fixed to the seat back 14 and a lower arm 20 fixed to a metal fitting portion 22 of the seat cushion frame. As seen in FIGS. 3 and 4 the lower end of the upper hinge arm 18 is pinned at 24 to the lower hinge arm 20.

A suitable coiled torsion spring reclining mechanism is generally indicated in phantom outline at 26 in FIG. 2. An example of a typical recliner mechanism is shown in U.S. Pat. No. 4,337,978, and reference may be had to that patent for an explanation thereof. The hinge member 16 may also include an inertia latch system that permits free movement of the seat back 14 while preventing its forward movement when a predetermined relative acceleration occurs. As the inertia latch mechanism forms no part of the present invention it has been deleted from the drawings for the purpose of clarity. An example of one type of inertia latch system suitable for use with the present invention is shown in U.S. Pat. No. 4,358,155 issued Nov. 9, 1982 to Osterhold et al.

A similar hinge member (not shown) is provided at the inboard side of the seat back 14. The hinge arms 18 and 20 coact to mount the seat back 14 for pivotal movement relative to the seat cushion 11. The seat back pivots about a generally horizontal axis of the hinge pin 24 between the upright seating position of FIGS. 1, 2 and 3 and the forwardly tilted and latched position of FIG. 4.

Seat 10 is supported on the vehicle for movement to a plurality of horizontally adjusted positions by a conventional track mechanism 28 which includes an upper track member 30 and a lower track member 32. The seat cushion 10 is connected to the upper C-sectioned track member 30 and is slidable on the lower U-sectioned track member 32. Track member 32 is mounted on the vehicle floor 12 by fore and aft brackets 34 and 36, respectively. The upper track 30 has a latch member 37 pivotally mounted on the top thereof by means of a vertically extending pivot pin 38 located in latch plate 39 and track member 30. A manually operable control means in the form of a track lever 40, having a handle portion 42, is fixedly attached to latch plate offset portion 44 (FIG. 5) by rivets 45. The latch offset portion 44 has a locking tab 46 extending laterally therefrom.

Upon manual rotation of the track lever 40 latch member 37 pivots about the pivot pin 38 in a counter clockwise direction indicated by the arrow 47 in FIG. 2. As a result the tab 46 is released from one of a series of lock openings 48 lanced in side flange 49 of the stationary lower track member 32. A coil tension spring 50 has one hooked end (not shown) connected to the aft end of the upper track member 30 and its other hooked end 51 connected to latch offset portion 44. The spring 50 is operative to urge or bias the lock tab 46 into engagement with one of the lock openings 48.

The latch plate 39 has one end of a pull rod 52 connected thereto by a hook portion 53. The rod 52 extends rearwardly with its aft end 54 connected to the lower portion of a seat actuating lever 55. The actuating lever 55 is pivotally connected to the lower seat arm 20 by pivot pin 56 for pivotal movement about a transverse axis. As seen in FIG. 2 the upper end of the actuating lever 55 has a latch pin 58 extending transversely inboard therefrom parallel to the axis of the pivot pin 56.

FIG. 2 shows the upper hinge arm 18 with a seat back latch mechanism generally indicated at 60. The latch mechanism 60 comprises a hook latch plate 62 and a striker plate 64 mounted in flush relationship. The striker plate 64 is fixedly secured to the upper hinge arm 18 by a fastener 66 and a transverse pivot pin 68. The latch plate 62 is supported by pivot pin 68 for pivotal movement thereon relative to the striker plate 64.

As best seen in FIGS. 3, 4 and 6 spring means, in the form of a wire torsion spring 70, urges the latch plate 62 to its spring biased clockwise rotational position. The biasing spring 70 has one end 72 hooked on fastener 66 and its other end formed with an L-shaped bend providing transverse finger portion 74 engaging an arcuate recess 76 in the latch plate 62.

The striker plate forward end has an obtuse angled notch defined by contact surfaces 78 and 80 providing a nose portion 82 with an inclined cam surface 84. The latch plate 62 is located inboard of the actuating lever 55 with the cam surface 84 is oriented rearwardly in spaced relation to the latch pin 58. It will be observed in FIGS. 3 and 6, the inclined cam surface 84 engages the latch pin 58 when the seat back 14 is initially moved forward. Upon the cam surface 84 engaging the latch pin 58 the actuating lever 55 is rotated counter-clockwise about pin 56 causing the latch pin 58 to engage arcuate hook portion 86 of the latch plate 62.

As seen in FIG. 3A the latch plate 62 is rotated counter-clockwise about pin 68 against the force of biasing spring 70. The camming of the hook portion 86 below the contact surface 80 allows the pin 58 to slide into engagement with the striker plate contact surface 78 as shown in FIG. 4. The seat back is thus latched in a forward titlted mode by virtue of the spring 70 returning the hook portion 86 to its biased position. It will be noted that a stop pin 87 is located in latch plate 62 and engages the striker plate 64, as seen in FIG. 3, to limit the biasing position of the latch plate.

The initial forward tilting of the seat back results in counter-clockwise pivotal rotation of the actuating lever 55. As a consequence the pullrod 52 pivots the latch plate 39 and unlatches the upper track member 30 from the lower track member 32. Thus, the tilting of the seat back allows the seat 10 to slide forward from its FIG. 7 normal upright position to its FIG. 8 easy entry position with the seat back forwardly latched as shown in FIG. 4.

To return the seat 10 to its seat back upright mode the operator moves the seat back 14 aft causing the seat cushion and its upper track member 30 to slide rearwardly to a selected seating position shown in FIG. 9. When the track sliding effort on the moving seat exceeds the torsion spring 70 biasing force the latch plate 62 rotates counter clockwise about pivot pin 68 unlocking and releasing latch pin 58. The unlocking of the seat back releases tension on the track latch coil spring 50 biasing the track latch member 37 clockwise to relatch the upper and lower track members. With the seat back 14 returned to its upright seating mode of FIG. 10 the operator assumes a seated position. The operator may then use the track lever handle 42 to adjust the seat 10 horizontally fore and aft in a conventional seat adjusting manner.

What is claimed is:

1. An easy entry seat latch mechanism adapted for a vehicle seat assembly including a seat cushion and a seat back, hinge means providing pivotal movement of said seat back relative to said seat cushion about a generally horizontal first axis between a generally upright normal position and a forwardly tilted position, track means mounting said seat cushion on said vehicle for horizontal movement to a plurality of fore and aft horizontal adjusted positions, a track latching assembly on said track means and resiliently biased in a latch direction by first spring means, said easy entry seat latching mechanism comprising, a lever member rotatably supported on said hinge means for pivotal movement about a second axis substantially parallel to said first axis;

means connecting said lever member to said track latching assembly such that said first spring means biases said lever member for rotation in a first track locking direction;

a dual acting seat back latch mechanism mounted on said seat back, said latch mechanism including second spring means biasing said latch mechanism into its latched mode;

said seat back latch mechanism initially operative, when said seat back is first pivoted forwardly to contact said lever member causing said lever member to be rotated in a second direction whereby said track latching assembly is unlocked freeing said seat cushion for horizontal movement on said track means to an easy entry forward position, said seat back latch mechanism subsequently operative upon said seat back being further pivoted to a forward tilted position to lockingly engage said lever member; and said seat cushion operative to be moved rearwardly from its easy entry position to a selected horizontal position, whereby upon subsequent pivoting of said seat back to its upright position by a force sufficient to overcome the resilient bias of said second spring means causes said seat back latch mechanism to unlock said lever member for rotation of said lever member in said first direction such that said first spring means returns said track latching assembly to a locked condition thereby maintaining said seat cushion in said selected horizontal position.

2. The easy entry latch mechanism as set forth in claim 1 wherein said mechanism including a striker member and latch member, said striker member fixed on said seat back and said latch member rotatably supported on said striker member for pivotal movement about a third axis substantially parallel to said first axis.

3. The easy entry latching mechanism as set forth in claim 2 wherein said lever member having its lower end connected to said track latching assembly and having a locking pin adjacent its upper end, and wherein said locking pin adapted to be engaged by said striker member causing said lever member to rotate in said one direction whereby said track latching assembly is unlatched.

4. An easy entry seat latch mechanism adapted for a vehicle seat assembly including a seat cushion and a seat back, said seat back having an upper hinge arm secured thereto extending downwardly from one side thereof, said seat cushion having a lower hinge arm secured thereto extending upwardly from said one side thereof, means connecting said upper and lower hinge arms providing pivotal movement of said seat back relative to said seat cushion about a generally horitzontal first axis between a generally upright normal position and a forwardly tilted position, track means mounting said seat cushion on said vehicle for horizontal movement to a plurality of fore and aft horizontal adjusted positions, a track latching assembly rotatably supported on said track means and resiliently biased in a latching direction by first spring means, said easy entry seat latch mechanism comprising;

a lever member rotatably supported on said lower hinge arm for pivotal movement about a second axis substantially parallel to said first axis;

means connecting the lower end of said lever member to said track latching assembly such that said first spring means biases said lever member for rotation in a first track locking direction, said lever member having a locking pin adjacent its upper end;

a seat back latch assembly including a striker member and a latch member, said striker member fixed on said upper hinge arm, said latch member rotatably supported on said striker member for pivotal movement about a third axis substantially parallel to said first axis, and second spring means biasing said latch member for rotation in said first direction;

said seat back latch mechanism initially operative, when said seat back is first pivoted forwardly to contact said locking pin causing said lever member to rotate in a second direction, whereby said track latching assembly is unlocked freeing said seat cushion for horizontal movement on said track means to an easy entry forward position;

said seat back latch mechanism subsequently operative upon said seat back being further pivoted to a forward tilted position to lockingly engage said locking pin; and said seat cushion operative to be moved rearwardly from its easy entry position to a selected horizontal position, whereby upon subsequent pivoting of said seat back to its upright position by a force sufficient to overcome the resilient bias of said second spring means causes said seat back latch mechanism to unlock said locking pin for rotation of said lever member in said first direction such that said first spring means returns said track latch assembly to a locked condition thereby maintaining said seat cushion in said selected horizontal position.

5. The easy entry seat latching mechanism as set forth in claim 4 wherein said latch plate having a stop pin thereon adapted to engage said striker plate to define the locked position of said striker plate.

* * * * *